United States Patent
Muschett

(10) Patent No.: US 7,881,932 B2
(45) Date of Patent: Feb. 1, 2011

(54) VOICEXML LANGUAGE EXTENSION FOR NATIVELY SUPPORTING VOICE ENROLLED GRAMMARS

(75) Inventor: Brien H. Muschett, Palm Beach Gardens, FL (US)

(73) Assignee: Nuance Communications, Inc., Burlington, MA (US)

(*) Notice: Subject to any disclaimer, the term of this patent is extended or adjusted under 35 U.S.C. 154(b) by 1157 days.

(21) Appl. No.: 11/537,769

(22) Filed: Oct. 2, 2006

(65) Prior Publication Data

US 2008/0082963 A1 Apr. 3, 2008

(51) Int. Cl.
- G10L 15/06 (2006.01)
- G10L 15/22 (2006.01)
- G06F 17/24 (2006.01)

(52) U.S. Cl. .................. 704/244; 704/270.1; 715/234
(58) Field of Classification Search .................. 704/244, 704/270, 275, 270.1; 379/88.03; 715/234
See application file for complete search history.

(56) References Cited

U.S. PATENT DOCUMENTS

| | | | |
|---|---|---|---|
| 5,917,891 A * | 6/1999 | Will | 379/88.03 |
| 6,389,395 B1 | 5/2002 | Ringland | |
| 6,539,359 B1 * | 3/2003 | Ladd et al. | 704/275 |
| 6,708,153 B2 * | 3/2004 | Brittan et al. | 704/260 |
| 6,961,776 B1 * | 11/2005 | Buckingham et al. | 709/229 |
| 6,985,865 B1 * | 1/2006 | Packingham et al. | 704/275 |
| 7,013,276 B2 | 3/2006 | Bickley et al. | |
| 7,117,159 B1 * | 10/2006 | Packingham et al. | 704/275 |
| 7,140,004 B1 * | 11/2006 | Kunins et al. | 717/125 |
| 7,180,986 B2 * | 2/2007 | Bettis et al. | 379/88.17 |
| 7,231,636 B1 * | 6/2007 | Evans | 717/127 |
| 7,313,527 B2 * | 12/2007 | Wu | 704/270.1 |
| 7,349,836 B2 * | 3/2008 | Da Palma et al. | 703/22 |
| 7,412,391 B2 * | 8/2008 | Nakagawa et al. | 704/270 |
| 7,487,085 B2 * | 2/2009 | Ativanichayaphong et al. | 704/235 |
| 7,546,527 B2 * | 6/2009 | Dames et al. | 715/239 |
| 7,657,828 B2 * | 2/2010 | Lucas et al. | 715/201 |
| 7,739,589 B2 * | 6/2010 | Muschett et al. | 715/234 |
| 2002/0169604 A1 | 11/2002 | Damiba et al. | |
| 2002/0173964 A1 | 11/2002 | Reich | |
| 2003/0009331 A1 | 1/2003 | Schalkwyk et al. | |
| 2003/0023440 A1 | 1/2003 | Chu | |
| 2003/0139925 A1 * | 7/2003 | Anderson et al. | 704/231 |
| 2004/0194016 A1 * | 9/2004 | Liggitt | 715/501.1 |
| 2004/0199375 A1 | 10/2004 | Ehsani et al. | |
| 2005/0171775 A1 | 8/2005 | Doyle | |
| 2006/0047510 A1 | 3/2006 | Ativanichayaphong et al. | |

(Continued)

OTHER PUBLICATIONS

"Automatic Speech Recognition", Loquendo, AMBR 042 ENG, Jan. 2006.

*Primary Examiner*—Martin Lerner
(74) *Attorney, Agent, or Firm*—Wolf, Greenfield & Sacks, P.C.

(57) ABSTRACT

The present invention extends the VoiceXML language model to natively support voice enrolled grammars. Specifically, three VoiceXML tags can be added to the language model to add, modify, and delete acoustically provided phrases to voice enrolled grammars. Once created, the voice enrolled grammars can be used in normal speaker dependent speech recognition operations. That is, the voice enrolled grammars can be referenced and utilized just like text enrolled grammars can be referenced and utilized. For example using the present invention, voice enrolled grammars can be referenced by standard text-based Speech Recognition Grammar Specification (SRGS) grammars to create more complex, usable grammars.

21 Claims, 4 Drawing Sheets

U.S. PATENT DOCUMENTS

2006/0074652 A1  4/2006  Ativanichayaphong et al.
2006/0136222 A1  6/2006  Cross et al.
2006/0230410 A1* 10/2006 Kurganov et al. ........... 719/311

* cited by examiner

| 210 Element | 212 addvoicephrase | 214 deletevoicephrase | 216 updatevoicephrase |
|---|---|---|---|
| 220 Attributes | 222 name phraseid phraseidexpr src srcexpr phrasenl phrasenlexpr weight recordphraseaudio consistencylevel clashlevel maxattempts minconsistent badphrasesuri audioinputurilist | 224 phraseid phraseidexpr src srcexpr | 226 phraseid phraseidexpr newphraseid newphraseidexpr src srcexpr phrasenl phrasenlexpr weight |
| 230 Returns | 232 maxattempts audio.ref audio.duration audio.size | 234 NONE | 236 NONE |
| 240 Events | 242 error.enroll.clash error.enroll.maxattempts | 244 error.enroll.deletevoicephrase | 246 error.enroll.updatevoicephrase |

FIG. 2

```xml
<?xml version="1.0" ?>
<vxml version="2.1" xmlns="http://www.w3.org/2001/vxml">
  <form id="addAPerson">
    <link dtmf="0123456789#*" next="#toplevel">
      <grammar src="file:/home/muschett/tmp/vegcommands.grxml"/>
    </link>
    <!-- ************************************************************ -->
    <!-- * Call addvoicephrase to add a new phrase to the           * -->
    <!-- * personal grammar.  Use a form level grammar to cancel    * -->
    <!-- * out.                                                     * -->
    <!-- ************************************************************ -->
    <ibm:addvoicephrase xmlns:ibm="http://www.ibm.com/voiceenroll"
       name = "enrollment"
       src = "http://muschett.bocaraton.ibm.com/pg"
       phraseidexpr = "'slot' + addressBookNextSlot"
       phrasenlexpr = "addressBookNextSlot"
       weight = "1.0"
       recordphraseaudio = "true"
       consistencylevel = "0.5"
       clashlevel = "0.5"
       maxAttemps = "3"
       minconsistent = "2"
       badphrasesuri = "vegcommands.grxml">
      <prompt count="1" timeout="5s">
        Please say the name that you would like to add, or say cancel.
      </prompt>
      <prompt count="2" timeout="5s">
        Say the name again.
      </prompt>
      <prompt count="3" timeout="5s">
        Say the name one more time.
      </prompt>
      <noinput>
        I'm sorry.  I didn't hear you.
        <reprompt/>
      </noinput>
      <filled>
        Your enrolled phrase is <audio expr="enrollment.audio.uri"/>
          <!-- submit audio to web server -->
        <goto next="#toplevel"/>
      </filled>
      <catch event="error.com.ibm.enroll.clash">
        That name sounds too similar to another name in your address
        book. I won't be able to understand it. Try using a different
        form of the name.
        <reprompt/>
      </catch>
      <catch event="error.com.ibm.enroll.maxattempts">
        Those names sound very different. Try to say the name the
        same way each time.
        <clear namelist="enrollment"/>
      </catch>
    </ibm:addvoicephrase>
  </form>
</vxml>
```

Labels: 300; Addvoicephrase Element 310; Attributes 320; Enrollment Session 330; Error Clash 340; Error MaxAttempts 342

FIG. 3

```
<?xml version="1.0" ?>
<vxml version="2.1" xmlns="http://www.w3.org/2001/vxml">
  <form id="deleteAPerson">
    <field name="slotID">
      <prompt bargein="false">
        Say the name of the person you'd like to remove.
      </prompt>
      <grammar src="http://muschett.bocaraton.ibm.com/ibmveg.grxml"/>
      <filled>
        <log label="vegmain::deleteAPerson:" expr="slotID"/>
      </filled>
      <noinput>
        I'm sorry, I didn't hear you.
        <reprompt/>
      </noinput>
      <nomatch>
        I'm sorry, I don't know that name. Please say a name I know.
      </nomatch>
    </field>
    <block>
      <ibm:deletevoicephrase xmlns:ibm="http://www.ibm.com/voiceenroll"
        src = http://muschett.bocaraton.ibm.com/pg"
        phraseidexpr = "slotID$.utterance"
      </ibm:deletevoicephrase>
      <goto next="#topLevel"/>
    </block>
    <catch event="error.com.ibm.enroll.deletephrase">
      <goto next="#topLevel"/>
    </catch>
    <catch event="error.badfetch.http">
      <goto next="#topLevel"/>
    </catch>
  </form>
</vxml>
```

Enrollment Session 430 — field block
Attributes 420 — Deletevoicephrase Element 410
Error Deleting 440

FIG. 4

```
<?xml version="1.0" ?>
<vxml version="2.1" xmlns="http://www.w3.org/2001/vxml">
  <form id="updateAPerson">
    <block>
      <ibm:updatevoicephrase xmlns:ibm="http://www.ibm.com/voiceenroll"
        src = "http://muschett.bocaraton.ibm.com/pg"
        phraseid = "slot1"
        newphraseid = "slot5"
        phrasenl = "5"
        weight = "1.0"
      </ibm:updatevoicephrase>
    </block>
    <catch event="error.com.ibm.enroll.updatephrase">
      <goto next="#topLevel"/>
    </catch>
    <catch event="error.badfetch.http">
      <goto next="#topLevel"/>
    </catch>
  </form>
</vxml>
```

Attributes 520 — Updatevoicephrase Element 510
Error Updating 540

FIG. 5

VOICEXML LANGUAGE EXTENSION FOR NATIVELY SUPPORTING VOICE ENROLLED GRAMMARS

BACKGROUND

1. Field of the Invention

The present invention relates the VoiceXML software language and, more particularly, a VoiceXML language extension for natively supporting voice enrolled grammars.

2. Description of the Related Art

Voice enrolled grammars are an industry standard speech recognition feature that permits users to enroll phrases into a recognition grammar using their voice. For example, a list of contacts can be created and maintained by recording spoken contact names. The spoken names are added to a speaker dependent recognition grammar, which can thereafter recognize future utterances of the names. This technique is sometimes referred to as speaker-dependent recognition. Use of voice enrolled grammars permits users to vocally customize personal services, such as Voice Activated Dialing services.

Voice enrollment often utilizes enrollment sessions to add, remove, or update acoustically provided phrases to an associated speech grammar, called a personal grammar. In an enrollment session, new acoustically provided phrases can be added to a personal grammar by initially providing a phrase, which may need to be repeated numerous times to ensure consistency is achieved for the phrase. If the new phrase does not clash with existing phrases in the personal grammar, a new phrase entry can be generated. The phrase entry can thereafter be speech recognized.

A voice enrolled grammar, unlike a text-based grammar, can be used in situations where a textual representation of a phrase is unavailable. This is often the case when a phrase represents a proper noun, such as a name. The following dialog example illustrates such a situation.

| User | Add a person to my address book |
|---|---|
| System | Please say the name you would like to add or say cancel. |
| User | Bob Smith |
| System | What is the phone number for [Bob Smith]? |
| User | Five five five one two one two |
| | *return to top level menu* |
| User | Call Bob Smith |
| System | Calling [Bob Smith] |
| | *System dials 555-1212* |

In the above example, voice enrollment can be used to add an acoustically provided phrase of [Bob Smith] to a personal grammar. It should be noted that the acoustically provided phrase is used not only to enroll [Bob Smith] but is recorded and presented back to the user in other interactions.

Conventional techniques for implementing voice enrolled grammars and related technologies in VoiceXML have significant shortcomings. These shortcoming result from a lack of native support for voice enrolled grammars in the VoiceXML language model. Existing solutions implementing voice enrolled grammars with VoiceXML based products use the Web programming model and/or a VoiceXML object tag to access voice enrollment features, neither of which provide native language access. This results in many programming inefficiencies and a lack of uniform handling of speech recognition tasks when using both text enrolled grammars and voice enrolled grammars.

SUMMARY OF THE INVENTION

This present invention extends the VoiceXML language model to natively support voice enrolled grammars. Specifically, three VoiceXML tags can be added to the language model to add, modify, and delete acoustically provided phrases to voice enrolled grammars. Once created, the voice enrolled grammars can be used in normal speaker-dependent speech recognition operations. That is, the voice enrolled grammars can be referenced and utilized just like text enrolled grammars can be referenced and utilized. For example, using the present invention, voice enrolled grammars can be reference by standard text-based Speech Recognition Grammar specification (SRGS) grammars to create more complex, usable grammars.

The present invention can be implemented in accordance with numerous aspects consistent with material presented herein. For example, one aspect of the present invention can include a VoiceXML language that includes voice enrolled grammar language elements as part of its language mode. The elements can include an addvoicephrase, a deletevoicephrase, and/or an updatevoicephrase element. The addvoicephrase element can be a VoiceXML element configured to add a voicephrase to a voice enrolled grammar. The deletevoicephrase element can be a VoiceXML element configured to delete a voice phrase from an existing voice enrolled grammar. The updatevoicephrase element can be a VoiceXML element configured to update a voice phrase included in an existing voice enrolled grammar. The language elements can permit voice enrolled grammars to be referenced by standard text-based grammars, such as a SRGS compliant grammar.

Another aspect of the present invention can include VoiceXML code for manipulating voice phrases contained within a voice enrolled grammar. The VoiceXML code can be stored on a medium accessible by a computing device, which is capable of executing programmatic instructions of the VoiceXML code. These programmatic instructions can cause the computing device to perform one or more programmatic actions relating to a voice enrolled grammar.

The VoiceXML code can include a VoiceXML native tag selected from a list of tags consisting of an addvoicephrase tag, a deletevoicephrase tag, and an updatevoicephrase tag. The code can also include an identifier associated with the VoiceXML native tag that identifies a voice phrase. Execution of the VoiceXML code can result in a change to the voice enrolled grammar relating to the identified voice phrase. Specifics of the change are determined be specifics associated with the VoiceXML native tag. The addvoicephrase tag can cause the identified voice phrase to be added to the grammar. The deletevoicephrase tag can cause the identified voice phrase to be deleted from the grammar. The updatevoicephrase tag can cause a grammar entry for the identified voice phrase to be updated with a new voice phrase.

It should be noted that various aspects of the invention can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, or any other recording medium. The program can also be provided as a digitally encoded signal conveyed via a carrier wave. The described program can be a single program or can be implemented as multiple subprograms, each of which interact within a single computing device or interact in a distributed fashion across a network space.

BRIEF DESCRIPTION OF THE DRAWINGS

There are shown in the drawings, embodiments which are presently preferred, it being understood, however, that the invention is not limited to the precise arrangements and instrumentalities shown.

FIG. 2 shows a table illustrating three VoiceXML elements that natively support voice enrolled grammars in accordance with an embodiment of the inventive arrangements disclosed herein.

FIG. 3 is a sample portion of VoiceXML code that demonstrates a use of the addvoicephrase element.

FIG. 4 is a sample portion of VoiceXML code that demonstrates a use of the deletevoicephrase element.

FIG. 5 is a sample portion of VoiceXML code that demonstrates a use of the updatevoicephrase element.

DETAILED DESCRIPTION OF THE INVENTION

Figure 1:
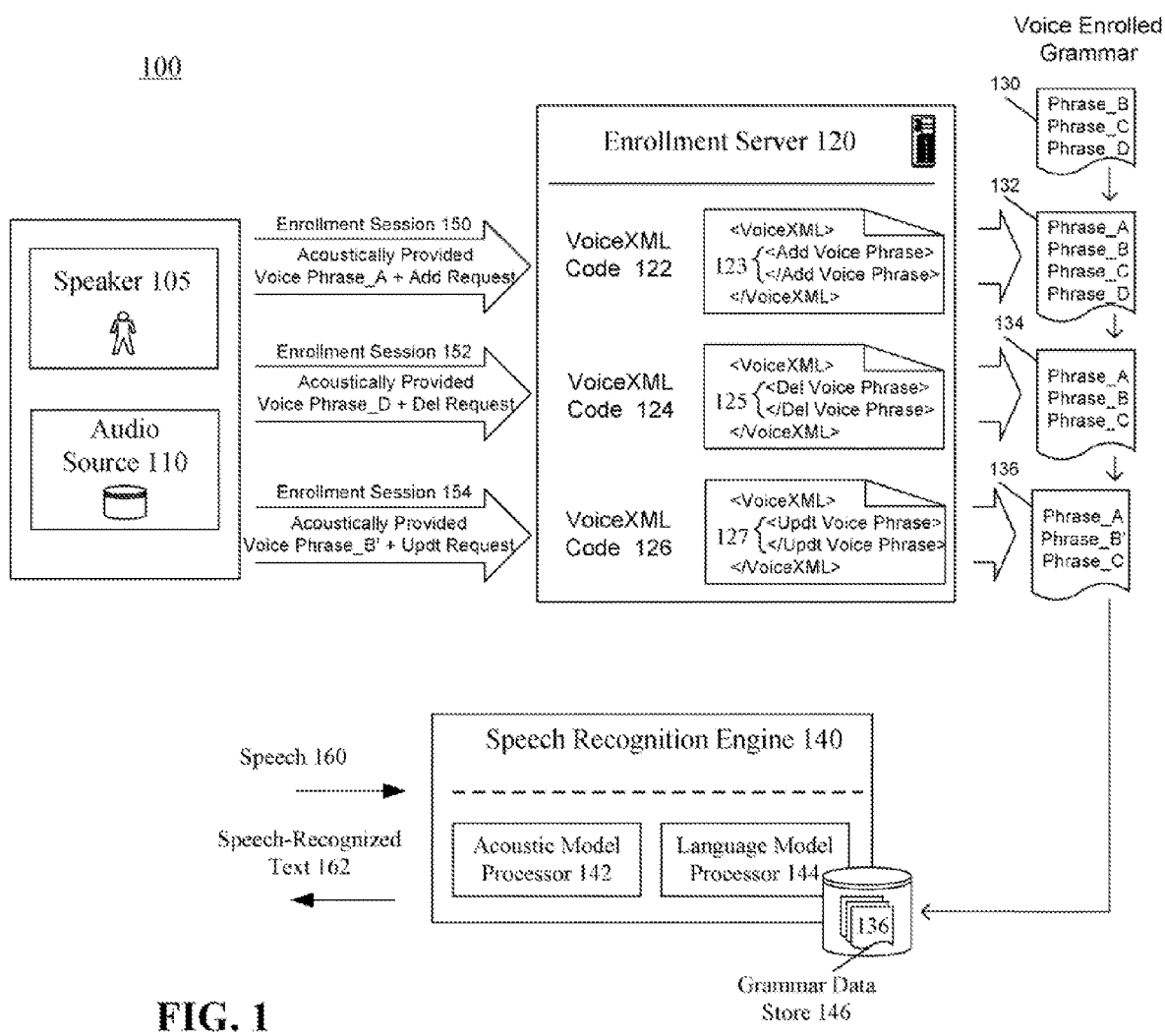
FIG. 1 is a schematic diagram of a system that permits acoustically provided phrases to be enrolled using VoiceXML code that natively supports voice enrolled grammars in accordance with an embodiment of the inventive arrangements disclosed herein.

FIG. 1 is a schematic diagram of a system 100 that permits acoustically provided phrases to be enrolled using VoiceXML code that natively supports voice enrolled grammars in accordance with an embodiment of the inventive arrangements disclosed herein. In system 100, a speaker 105 or audio source 110 participating in enrollment sessions 150-154 with enrollment server 120 can modify a set of phrases contained within a voice enrolled grammar 130-136. Each of the enrollment sessions 150-154 can be conducted in accordance with VoiceXML code 122-126 with causes the enrollment server 120 to perform programmatic actions. The modified voice enrolled grammar 136 can be contained within a grammar date store 146 used by a speech recognition engine 140, which is able to convert speech 160 into speech-recognized text 162.

More specifically, during enrollment session 150, acoustically provided voice phrase (Phrase_A) can be provided to enrollment server 120 along with a request to add the phrase to a voice enrolled grammar 130. The voice enrolled grammar 130 can be a personal grammar or a speaker dependent grammar associated with speaker 105. Grammar 130 can originally include Phrase_B, Phrase_C, Phrase_D. VoiceXML code 122, which can include a VoiceXML native tag 123 for adding a voice phrase, can cause Phrase_A to be added to the grammar 130, which results in modified grammar 132. Grammar 132 can include Phrase_A, Phrase_B, Phrase_C, and Phrase_D.

During a different enrollment session 152, an acoustically provided phrase (Phrase_D) can be provided to enrollment server 120 along with a request to delete the identified phrase from grammar 132. VoiceXML code 124, which can include a VoiceXML native tag 125 for deleting a voice phrase, can cause Phrase_D to be removed from the grammar 132, which results in modified grammar 134. Grammar 134 can, thus, include Phrase_A, Phrase_B, Phrase_C.

Finally, during enrollment session 154, an acoustically provided phrase (Phrase_B') can be provided to enrollment server 120 along with a request to update Phrase_B using Phrase_B'. VoiceXML code 126, which can include a VoiceXML native tag 127 for updating a voice phrase, can cause Phrase_B to be modified, which results in modified grammar 136. Grammar 136 can, thus, include Phrase_A, Phrase_B', and Phrase_C.

It should be noted that the audio source 110 can include a set of previously recorded audio phrases, such as dialog phrases previously uttered by speaker 105 during one or more dialog sessions. In one configuration of system 100, modifications to the grammars 130-136 can occur during a dialog session based upon input directly provided by speaker 105. In another configuration, modifications to the grammars 130-136 can be handled as batch processes, which receive input from audio source 110. This input can include phrases previously uttered by speaker 105.

As previously noted, the speech recognition engine 140 can include a date store 146 that contains the voice enrolled grammar 136. Engine 140 can include an acoustic model processor 142 and a language model processor 144. The language model processor 144 can utilize words, phrases, weights, and rules defined by grammars 136 of data store 146. The language processor 144 can be configured to handle grammar-based language model grammars as well as statistical language model grammars.

Once enrolled, the voice enrolled grammar 130-136 can be referenced and used by the speech recognition engine 140 just like a text-based grammar. Accordingly, voice enrolled grammars 136 can be referenced by any standard text-based grammar, such as a Speech Recognition Grammar Specification (SRGS) compliant grammar to create more complex, usable grammars.

It should be realized that components of system 100 can be communicatively linked via one or more networks (not shown). The networks can include any hardware/software/ and firmware necessary to convey digital content encoded within carrier waves. Content can be contained within analog or digital signals and conveyed through data or voice channels. The networks can include local components and data pathways necessary for communications to be exchanged among computing device components and between integrated device components and peripheral devices. The networks can also include network equipment, such as routers, data lines, hubs, and intermediary servers which together form a packet-based network, such as the Internet or an intranet. The networks can further include circuit-based communication components and mobile communication components, such as telephony switches, modems cellular communication towers, and the like. The networks can include line based and/or wireless communication pathways.

FIG. 2 shows a table 200 illustrating three VoiceXML elements that natively support voice enrolled grammars in accordance with an embodiment of the inventive arrangements disclosed herein. Table 200 can contextually apply to the tags 123, 125, and/or 127 of system 100. It should be appreciated that specific names and details for each of the elements of table 200 are for illustrative purposes only and that alternative implementations of the concepts expressed herein are contemplated.

Each of the elements 212-216 in table 200 are elements 210 of a VoiceXML language mode. The elements 210 can include an addvoicephrase 212 element, a deletevoicephrase 214 element, and an updatevoicephrase 216 element. Each element 212-216 can have a defined set of attributes 220, returns 230, and associated events 240. All attribute 220 values can correspond to VoiceXML naming conventions. Additionally, phrase related values used for speech recognition grammars can conform to the naming rules specified for by a Speech Recognition Grammar Specification (SRGS) compliant grammar. The invention is not limited in this regard, and the phrases used for speech recognition can conform to other similar specifications, such as a NUANCE Grammar Specification Language (GSL) specification, a JAVA Speech Grammar Format (JSGF) specification, and the like, depending upon implementation specifics.

The addvoicephrase 212 element can be a VoiceXML input item that can be used to add a phrase to a new or existing voice enrolled grammar. The addvoicephrase 212 element can collect voice input and can generate a phrase entry in the personal grammar if the input does not clash with existing phrases or with entries associated with a set of bed phrases associated with a badphrasesuri attribute. In many cases, input can be collected multiple times until either it's consistent or until the input has exceeded a maximum number of attempts, which can be indicated by a maxattempts attribute.

The addvoicephrase 212 input item can provide two methods to obtain input. The first method, which can be a system default, can use normal input collection in the caller's voice can be used for phrase enrollment. The second method can use a set of acoustic phrases associated with an audioinputurilist attribute. This attribute can specify one or more URI's for which audio can be retrieved. Retrieved audio can then be used for phrase enrollment purposes. This includes audio references resulting from use of the VoiceXML record tag or the VoiceXML recordutterance property.

The addvoicephrase 212 can collect input from an input source referenced by the audioinputurilist attribute for each utterance collection necessary to achieve consistency. If the list length cannot satisfy the consistency requirement then an error event associated with the maximum number of attempts (e.g. error.enroll.maxattampts) can be triggered. This triggered event can be generated unless the minconsistent attribute is set to a value of one. Prompting can continuously occur up to number of attempts reference by the maxattempts attribute so the audio source referenced by the audioinputurilist attribute can be used each time the prompt count is increased.

It should be noted that the audio source referenced by the audioinputurilist attribute can be used for batch mode operation where audio has previously been collected. Hence, enrollment can be automated. In such an arrangement, the maxattempts attribute and the minconsistent attribute can be set to a value of one and attributes for clash and consistency levels can be set to the most lenient values. The audioinputurilist attribute can reference one audio source. If the application leave the enrollment input item, enrollment can be aborted and the enrollment grammar can remain unchanged.

It should also be noted that the addvoicephrase 212 element can support the same sub-elements as the other VoiceXML 2.0 input items with the exception of those elements related to speech and DTMF input (e.g., grammar, link, option). Local grammars may not be permitted. Global grammars can be used to terminate phrase enrollment and in some cases may result in an assignment to the input item name. In addition, the behavior of an input collection phase can be identical to the VoiceXML input collection phases as defined in Appendix C of the VoiceXML 2.0 specification. In addition to the attributes 222, the addvoicephrase 212 element can support additional VoiceXML attributes, such as cond, modal, and expr, as defined for input items.

The attributes 222 associated with the addvoicephrase 212 element can include attributes of name, phraseid, phraseidexpr, src, srcexpr, phrasenl, phrasenlexpr, weight, recordphraseaudio, consistencylevel, classlevel, maxattempts, minconsistent, badphrasesuri, audioinputurilist, and other such attributes. The name attribute can be a form item variable in the dialog scope that holds a result. The name attribute should be unique among form items in the form. If the name is not unique, then a badfetch error can be thrown when a related document is fetched. Upon successful enrollment, a value of the name attribute can be the phraseid for an enrolled voice phrase. Shadow variables can be assigned depending on a value of the recordphraseaudio attribute.

The phraseid attribute can be a required attribute that represents an id of a voice phrase being added. An alternative to the phraseid attribute is the phraseidexpr attribute, which is associated with a phrase expression instead of a reference to an expression. A value for the phraseid or phraseidexpr can be returned in application.lastresult$.utterance when a personal grammar is used for normal speech recognition. If neither the phraseid nor phraseidexpr is specified, a badfetch error and be thrown.

The src attribute can be a required attribute that represents the new or existing personal grammar that will be updated with the new phraseid. An alternative to the src attribute is the srcexpr attribute, which is associated with a grammar's identifier instead of a reference to a grammar identifier. The grammar can be updated at the URI using an HTTP PUT request. If neither the src nor the srcexpr is specified, a badfetch error can be thrown.

The phrasenl attribute can be an optional attribute used to specify a semantic tag value to associate with the phraseid. Phrasenlexpr can be used in place of phrasenl. A value for the phrasenl or phrasenlexpr attribute can be returned in application.lastresult$.interpretation when a personal grammar is recognized. If neither the phrasenl nor the phrasenlexpr attribute is specified, a badfetch error is thrown.

The weight attribute can be an optional attribute that specifies a phrase weight. The weight attribute can be implemented as a float type having a value form 0.0 to 1.0.

The recordphraseaudio attribute can be an optional attribute that is used to specify whether an associated phrase recording is returned upon successful enrollment. Values for the recordphraseaudio attribute can include a true and a false value, where false can be a default. When a value of recordphraseaudio is true, then shadow variables for bestrecording, bestrecordingsize, and bestrecordingduration can be assigned to the input item variable upon successful enrollment. The bestrecording variable can store a reference to the recording, or remain undefined if no audio is collected. Implementation for the bestrecording variable can be platform specific. The bestrecordingsize variable can store a size of the recording (in bytes), or can remain undefined if no audio is collected. The bestrecordingduration variable can store a duration of the recording (in milliseconds), or undefined if no audio is collected. When a value of recordphraseaudio is false, then the shadow variables can be undefined and an input item variable can be assigned a value of the phraseid that was enrolled.

The consistencylevel attribute can be an optional attribute used to specify a level of similarity needed between utterances to obtain a consistent pronunciation.

A value of the consistencylevel attribute can be between 0.0 and 1.0. The higher the level of the consistencylevel attribute, the closer a match. The consistencylevel attribute can defaults to a platform specific value.

The clashlevel attribute can be an optional attribute used to specify a level of similarity between two different pronunciations that is needed to be unambiguous.

A value of the clashlevel attribute can be between 0.0 and 1.0. The higher value for the clashlevel attribute can represent an increased opportunity for clashes while reducing a likelihood of recognition ambiguity among other phrases. A lower value for the clashlevel attribute can reduce clashes but can increase a likelihood of recognition ambiguity among other phrases. The clashlevel attribute can default to a platform specific value. A value of '0.0' for the clashlevel attribute can signify that a clash test will not be performed.

The maxattempts attribute can be an optional attribute used to specify the maximum number of training attempts that will be used to achieve a consistent statistical model. When a value of the maxattempts attribute is exceeded an "error.enroll.maxattempts" event can result and the input item variable can be assigned the number of attempts performed. A default value for the maxattempts attribute can be four (4). A range of values for the maxattempts attribute can be 0<minconsistent<=maxattempts or an error badfetch can be thrown.

The minconsistent attribute can be an optional attribute used to specify the minimum number of consistent pronunciations that must be obtained to voice enroll a phrase. A default value for the minconsistent attribute can be two (2). A range of values for the minconsistent attribute can be one (1) to maxattempts.

The badphrasesuri attribute can be an optional attribute used to specify an SRGS grammar that contains phrases that should not be spoken as part of the enrollment. Phrases that match this grammar can generate a clash event.

The audioinputurilist attribute can be an optional attribute used to specify the location of audio to use for batch mode phrase enrollment of enrollment where the audio is collected in a separate dialog using VoiceXML record or 'recordutterance'. The attribute type can be a comma separated URI list of one (1) or more elements used to satisfy the collection of a phrase up to minconsistent or maxattempts. When the URI list is exhausted before consistency is reached, a maxattempts event can result. To batch enroll, maxattempts should set to one (1), minconsistent should be set to one (1) and one audio URI should be exist.

The addvoicephrase 212 element can return one or more object 232 that is either a complex or simple result depending upon an enrollment outcome. The return object 222 can include a phraseid object, a maxattempts object, an audio.ref object, an audio.duration object and an audio.size object. The phraseid object can specify a successfully enrolled phraseid, when the recordphraseaudio attribute is false. The maxattempts object can return a number of attempts made whenever an enrollment session fails due to an occurrence of a maximum number of attempts without achieving a minimum consistency among voice phrases. The audio.ref object can include an audio URI when the recordphraseaudio attribute is true. The audio.ref object can include a duration of audio referenced by the audio.ref object. The duration can be in milliseconds by default. The audio.size object can include a length a audio, which can be in bytes by default.

The addvoicephrase 212 element can situationally generate events 242 of error.enroll.clash and error.enroll.maxattempts. The error.enroll.clash event can be generated when a clash is detected between the voice phrase and an existing phrase in the voice enrolled grammar (reference by grammar URI) or between the voice phrase and a phrase contained in a set of bad grammar phrases (referenced by the badphrasesuri attribute). The value of the message associated with this event, which can be returned in object 232, can be a comma delimited list of phraseids and a comma delimited list of confusable phrases. The error.enroll.maxattempts event can be generated when consistency is not achieved within a maximum number of attempts, as determined by the maxattempts attribute. The value of a message associated with this event, which can be returned in object 232, can be the maxattempts count.

The deletevoicephrase 214 element can be a VoiceXML executable item that is used to delete a phrase from an existing voice enrolled grammar. The deletevoicephrase 214 element can be associated with numerous attributes 224, which include a phraseid attribute, phraseidexpr attribute, a src attribute, a srcexpr attribute, and the like.

The phraseid attribute can be a required attribute that represents the id of the phrase to be deleted. Phraseidexpr can be used in place of phraseid. The phraseid or phraseidexpr attribute can be returned in application.lastresult$.utterance when a personal grammar is used for normal speech recognition. If neither the phraseid or phraseidexpr is specified, a badfetch error can be thrown.

The src attribute can be a required attribute that represents the existing personal grammar that will be updated by removing the phraseid. Srcexpr can be used in place of src. The grammar can be updated at the URI using HTTP PUT request. When the deleted phrase is the last phrase in the grammar, an HTTP DELETE request can be sent to the server. If neither the src or srcexpr is specified, a badfetch error can be thrown.

No return object 234 is associated with the deletevoicephrase 214 element, which can be an executable item that does not return anything. The deletevoicephrase 214 element can generate an event 244 of error.enroll.deletevoicephrase when a voice phrase deletion attempt was made using the deletevoicephrase 214 element and when the phrase was unable to be deleted.

The updatevoicephrase 216 element can be an executable item used to update a phrase in an existing voice enrolled grammar. The updatevoicephrase 216 element can be associated with numerous attributes 226, which include a phraseid attribute, phraseidexpr attribute, a newphraseid attribute, a newphraseidexpr attribute, a src attribute, a srcexpr attribute, a phrasenl, a phrasenlexpr attribute, a weight, and the like.

The phraseid attribute can be a required attribute that represents the id of the phrase to be updated. Phraseidexpr can be used in place of phraseid. The phraseid or phraseidexpr attribute can be returned in application.lastresult$.utterance when a personal grammar is used for normal speech recognition. If neither the phraseid nor phraseidexpr is specified, a badfetch error can be thrown.

The newphraseid attribute can be a required attribute that represents the id of the new phrase to be added. Newphraseidexpr can be used in place of newphraseid. The newphraseid or newphraseidexpr attribute can be returned in application.lastresult$.utterance when a personal grammar is used for normal speech recognition. If neither the newphraseid nor the newphraseidexpr is specified, a badfetch error can be thrown.

The src attribute can be a required attribute that represents an existing personal grammar that will be updated with the new phraseid. Srcexpr can be used in place of src. The grammar can be updated at the URI using HTTP PUT request. One of src or srcexpr must be specified or a badfetch error is thrown.

The phrasenl can be an optional attribute used to specify a semantic tag value to associate with the phrase ID. Phrasenlexpr can be used in place of phrasenl. The phrasenl or phrasenlexpr attribute can be returned in application.lastresult$.interpretation when a personal grammar is recognized. One of phrasenl or phrasenlexpr must be specified or a badfetch error is thrown.

The weight attribute can be an optional attribute used to specify the phrase weight as a float from 0.0 to 1.0.

No return object 236 is associated with the updatevoicephrase 216 element, which can be an executable item that does not return anything. The updatevoicephrase 216 element can generate an event 246 of error.enroll.updatevoicephrase when a voice phrase update attempt was made using the updatevoicephrase 216 element and when the phrase was unable to be updated.

FIG. 3 is a sample portion of VoiceXML code 300 that demonstrates a use of the addvoicephrase element 310. The code 300 defines attributes 320 for element 310. Code 300 also includes prompts for an enrollment session 330, where an acoustically provided phrase that is added to a grammar using element 310 is obtained. The error clash 340 section shows how error handling is performed for an error.enroll.clash event. The error maxattempts 342 section shows how error handling is performed for an error.enroll.maxattempts event.

FIG. 4 is a sample portion of VoiceXML code 400 that demonstrates a use of the deletevoicephrase element 410. The code 400 defines attributes 420 for element 410. Code 400 also includes prompts for an enrollment session 430, where an acoustically provided phrase that is to be deleted from a grammar is obtained. The error deleting 440 section shows how error handling is performed for an error.enroll.deletephrase event.

FIG. 5 is a sample portion of VoiceXML code 500 that demonstrates a use of the updatevoicephrase element 510. The code 500 defines attributes 520 for element 510. The error updating 540 section shows how error handling is performed for an error.enroll.updatephrase event.

The present invention may be realized hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A computer-readable recordable storage medium having recorded thereon computer-executable instructions that, when executed by a computer, cause the computer to carry out a method, the method comprising:

prompting a user to provide speech input; and processing the speech input, wherein the processing comprises editing at least one voice-enrolled grammar based on the speech input, the at least one voice-enrolled grammar comprising at least one word or phrase added to the voice-enrolled grammar by the user, wherein the computer-executable instructions are implemented as VoiceXML code, the VoiceXML code comprising at least one VoiceXML tag associated with the editing of the at least one voice-enrolled grammar and an identifier associated with the at least one VoiceXML tag that identifies at least one voice phrase of the at least one voice-enrolled grammar to be edited, and wherein editing the at least one voice-enrolled grammar comprises editing in accordance with attributes associated with the at least one VoiceXML tag.

2. The computer-readable recordable storage medium of claim 1, wherein editing the at least one voice-enrolled grammar comprises creating the at least one voice-enrolled grammar including the at least one word or phrase identified by the speech input and making the at least one voice-enrolled grammar available to be used by a speech recognition engine with standard text-based grammars.

3. The computer-readable recordable storage medium of claim 2, wherein making the at least one voice-enrolled grammar available to be used by the speech recognition engine with said standard text-based grammars comprises making the at least one voice-enrolled grammar available to be used by the speech recognition engine with Speech Recognition Grammar Specification (SRGS)-compliant grammars.

4. The computer-readable recordable storage medium of claim 1, wherein editing the at least one voice-enrolled grammar based on the speech input comprises:

adding a first voice phrase to a voice-enrolled grammar, the speech input comprising the first voice phrase; and/or deleting a second voice phrase from an existing voice enrolled grammar, the speech input comprising the second voice phrase.

5. The computer-readable recordable storage medium of claim 4, wherein editing the at least one voice-enrolled grammar based on the speech input further comprises:

updating a third voice phrase included in an existing voice-enrolled grammar by replacing the third voice phrase with a new voice phrase, the speech input comprising the third voice phrase and/or the new voice phrase.

6. The computer-readable recordable storage medium of claim 5, wherein editing the at least one voice-enrolled grammar comprises adding phrase-related values to the at least one voice-enrolled grammar, the phrase-related values conforming to naming rules specified by a Speech Recognition Grammar Specification (SRGS)-compliant grammar.

7. A computer-readable recordable storage medium having recorded thereon computer-executable instructions that, when executed by a computer, cause the computer to carry out a method, the method comprising:

prompting a user to provide speech input; and processing the speech input, wherein the processing comprises editing at least one voice-enrolled grammar based on the speech input, the at least one voice-enrolled grammar comprising at least one word or phrase added to the voice-enrolled grammar by the user, wherein the computer-executable instructions are implemented as VoiceXML code, wherein editing the at least one voice-enrolled grammar based on the speech input comprises:

adding a first voice phrase to a voice-enrolled grammar, the speech input comprising the first voice phrase; and/or deleting a second voice phrase from an existing voice enrolled grammar, the speech input comprising the second voice phrase, and wherein adding the first voice phrase to the voice-enrolled grammar comprises executing a VoiceXML command comprising a plurality of attributes, said plurality of attributes comprising at least three attributes selected from a group of attributes consisting of a first attribute identifying a name of a variable for storing the first voice phrase, a second attribute identifying a first identifier for the first voice phrase, a third attribute identifying a second identifier for an expression to which the first voice phrase relates, a fourth attribute identifying the voice-enrolled grammar to which the first voice phrase is to be added, a fifth attribute identifying an expression of the voice-enrolled grammar to which the first voice phrase relates, a sixth attribute specifying a semantic tag value to be associated with the first voice phrase in the voice-enrolled grammar, a seventh attribute specifying a semantic tag value to be associated with an expression of the voice-enrolled grammar to which the first voice phrase relates, an eighth attribute specifying a phrase weight, a ninth attribute specifying whether audio corresponding to the first voice phrase is to be returned when the first voice phrase is successfully added to the voice-enrolled grammar, a tenth attribute identifying a level of consistency required between the first voice phrase and a potential voice command for the potential voice command to be determined to match the first voice phrase, an eleventh attribute identifying a level of similarity between pronunciations of voice phrases for the voice phrases to be unambiguous, a twelfth attribute identifying a maximum number of training attempts that will be used to achieve a consistent statistical model, a thirteenth attribute identifying a minimum number of consistent speech inputs to be received from a user for the first voice phrase to be added to the voice-enrolled grammar, a fourteenth attribute identifying a set of one or more other voice phrases to which the first voice phrase should be compared to determine whether the first voice phrase clashes with any of the one or more other voice phrases, and an fifteenth attribute specifying a storage location of audio of one or more voice phrases to be added to the voice-enrolled grammar.

8. A computer-readable recordable storage medium having recorded thereon computer-executable instructions that, when executed by a computer, cause the computer to carry out a method, the method comprising:

prompting a user to provide speech input; and processing the speech input, wherein the processing comprises editing at least one voice-enrolled grammar based on the speech input, the at least one voice-enrolled grammar comprising at least one word or phrase added to the voice-enrolled grammar by the user, wherein the computer-executable instructions are implemented as VoiceXML code, wherein editing the at least one voice-enrolled grammar based on the speech input comprises:

adding a first voice phrase to a voice-enrolled grammar, the speech input comprising the first voice phrase; and/or deleting a second voice phrase from an existing voice enrolled grammar, the speech input comprising the second voice phrase, and wherein adding the first voice phrase to the voice-enrolled grammar comprises receiving, following the adding, return values depending on an outcome of the adding, said return values comprising at least two values selected from a group of values consisting of a first value identifying an identifier for the first voice phrase, a second value identifying a current number of successive failed attempts at adding, a third value identifying a location from which audio of the first voice phrase can be retrieved, a fourth value identifying a duration of the audio of the first voice phrase, and a fifth value identifying a storage size of the audio of the first voice phrase.

9. A computer-readable recordable storage medium having recorded thereon computer-executable instructions that, when executed by a computer, cause the computer to carry out a method, the method comprising:

prompting a user to provide speech input; and processing the speech input, wherein the processing comprises editing at least one voice-enrolled grammar based on the speech input, the at least one voice-enrolled grammar comprising at least one word or phrase added to the voice-enrolled grammar by the user, wherein the computer-executable instructions are implemented as VoiceXML code, wherein editing the at least one voice-enrolled grammar based on the speech input comprises:

adding a first voice phrase to a voice-enrolled grammar, the speech input comprising the first voice phrase; and/or deleting a second voice phrase from an existing voice enrolled grammar, the speech input comprising the second voice phrase, and wherein the method further comprises detecting an error during the adding, wherein detecting the error comprises detecting at least one of a first error arising when a clash is detected between the first voice phrase to be added and at least one existing voice phrase in the voice-enrolled grammar or between the first voice phrase and another voice phase contained within a list of bad voice phrases maintained for the voice-enrolled grammar, and a second error arising when consistency of the first voice phrase attempted to be added is not achieved within an established maximum number of attempts.

10. A computer-readable recordable storage medium having recorded thereon computer-executable instructions that, when executed by a computer, cause the computer to carry out a method, the method comprising:

prompting a user to provide speech input; and processing he speech input, wherein the processing comprises editing at least one voice-enrolled grammar based on the speech input, the at least one voice-enrolled grammar comprising at least one word or phrase added to the voice-enrolled grammar by the user, wherein the computer-executable instructions are implemented as VoiceXML code, wherein editing the at least one voice-enrolled grammar based on the speech input comprises:

adding a first voice phrase to a voice-enrolled grammar, the speech input comprising the first voice phrase; and/or deleting a second voice phrase from an existing voice enrolled grammar, the speech input comprising the second voice phrase, and wherein deleting the second voice phrase from the voice-enrolled grammar comprises executing a VoiceXML command comprising a plurality of attributes, said plurality of attributes comprising at least two attributes selected from a group of attributes consisting of a first attribute identifying a first identifier for the second voice phrase, a second attribute identifying a second identifier for an expression to which the second voice phrase relates, a third attribute identifying the voice-enrolled grammar from which the second voice phrase is to be deleted, and a fourth attribute identifying an expression of the voice-enrolled grammar to which the second voice phrase relates.

11. A computer-readable recordable storage medium having recorded thereon computer-executable instructions that, when executed by a computer, cause the computer to carry out a method, the method comprising:
prompting a user to provide speech input; and
processing the speech input, wherein the processing comprises editing at least one voice-enrolled grammar based on the speech input, the at least one voice-enrolled grammar comprising at least one word or phrase added to the voice-enrolled grammar by the user,
wherein the computer-executable instructions are implemented as VoiceXML code,
wherein editing the at least one voice-enrolled grammar based on the speech input comprises:
adding a first voice phrase to a voice-enrolled grammar, the speech input comprising the first voice phrase; and/or
deleting a second voice phrase from an existing voice enrolled grammar, the speech input comprising the second voice phrase, and
wherein the method further comprises detecting an error during the deleting when an attempt to delete the second voice phrase is made and the second voice phrase is not able to be deleted.

12. A computer-readable recordable storage medium having recorded thereon computer-executable instructions that, when executed by a computer, cause the computer to carry out a method, the method comprising:
prompting a user to provide speech input; and
processing the speech input, wherein the processing comprises editing at least one voice-enrolled grammar based on the speech input, the at least one voice-enrolled grammar comprising at least one word or phrase added to the voice-enrolled grammar by the user,
wherein the computer-executable instructions are implemented as VoiceXML code,
wherein editing the at least one voice-enrolled grammar based on the speech input comprises:
adding a first voice phrase to a voice-enrolled grammar, the speech input comprising the first voice phrase; and/or
deleting a second voice phrase from an existing voice enrolled grammar, the speech input comprising the second voice phrase,
wherein editing the at least one voice-enrolled grammar based on the speech input further comprises:
updating a third voice phrase included in an existing voice-enrolled grammar by replacing the third voice phrase with a new voice phrase, the speech input comprising the third voice phrase and/or the new voice phrase, and
wherein updating the third voice phrase comprising executing a VoiceXML command comprising a plurality of attributes, said plurality of attributes comprising at least two attributes selected from a group of attributes consisting of a first attribute identifying a first identifier for the third voice phrase, a second attribute identifying a second identifier for a first expression to which the third voice phrase relates, a third attribute identifying a third identifier for the new voice phrase, a fourth attribute identifying a third identifier for a second expression to which the new voice phrase relates, a fifth attribute identifying the voice-enrolled grammar containing the third voice phrase to be updated, a sixth attribute identifying an expression of the voice-enrolled grammar to which the new voice phrase relates, a seventh attribute specifying a semantic tag value to be associated with the new voice phrase in the voice-enrolled grammar, an eighth attribute specifying a semantic tag value to be associated with an expression of the voice-enrolled grammar to which the new voice phrase relates, and a ninth attribute specifying a phrase weight for the new voice phrase.

13. A computer-readable recordable storage medium having recorded thereon computer-executable instructions that, when executed by a computer, cause the computer to carry out a method, the method comprising:
prompting a user to provide speech input; and
processing the speech input, wherein the processing comprises editing at least one voice-enrolled grammar based on the speech input, the at least one voice-enrolled grammar comprising at least one word or phrase added to the voice-enrolled grammar by the user.,
wherein the computer-executable instructions are implemented as VoiceXML code,
wherein editing the at least one voice-enrolled grammar based on the speech input comprises:
adding a first voice phrase to a voice-enrolled grammar, the speech input comprising the first voice phrase; and/or
deleting a second voice phrase from an existing voice enrolled grammar, the speech input comprising the second voice phrase,
wherein editing the at least one voice-enrolled grammar based on the speech input further comprises:
updating a third voice phrase included in an existing voice-enrolled grammar by replacing the third voice phrase with a new voice phrase, the speech input comprising the third voice phrase and/or the new voice phrase, and
wherein the method further comprises detecting an error during the updating when an attempt to update the third voice phrase is made and the third voice phrase is not able to be updated.

14. A method comprising:
using a voice browser executing on at least one programmed processor, executing VoiceXML code for manipulating voice phrases contained within a voice-enrolled grammar, the VoiceXML code comprising at least one VoiceXML tag for editing the voice-enrolled grammar and an identifier associated with the at least one VoiceXML tag that identifies a voice phrase to be edited, wherein execution of the VoiceXML code by the voice browser causes the voice browser to:
prompt a user to provide speech input; and
process the speech input, wherein the processing comprises making a change to the voice-enrolled grammar relating to the voice phrase, wherein specifics of the change are determined by attributes associated with the VoiceXML tag, and wherein the at least one voice-enrolled grammar comprises at least one word or phrase added to the voice-enrolled grammar by the user.

15. The method of claim 14, wherein making the change comprises adding the voice phrase to the voice-enrolled grammar.

16. The method of claim 14, wherein the adding the voice phrase to the voice-enrolled grammar comprises executing a VoiceXML tag comprising a plurality of attributes, said plurality of attributes comprising at least three attributes elected from a group of attributes consisting of a first attribute identifying a name of a variable for storing the first voice phrase, a second attribute identifying a first identifier for the first voice phrase, a third attribute identifying a second identifier for an expression to which the first voice phrase relates, a fourth attribute identifying the voice-enrolled grammar to which the first voice phrase is to be added, a fifth attribute identifying an expression of the voice-enrolled grammar to which the first voice phrase relates, a sixth attribute specifying a semantic tag value to be associated with the first voice phrase in the voice-enrolled grammar, a seventh attribute specifying a semantic tag value to be associated with an expression of the voice-enrolled grammar to which the first voice phrase relates, an eighth attribute specifying a phrase weight, a ninth attribute specifying whether audio corresponding to the first voice phrase is to be returned when the first voice phrase is successfully added to the voice-enrolled grammar, a tenth attribute identifying a level of consistency required between the first voice phrase and a potential voice command for the potential voice command to be determined to match the first voice phrase, an eleventh attribute identifying a level of similarity between pronunciations of voice phrases for the voice phrases to be unambiguous, a twelfth attribute identifying a maximum number of training attempts that will be used to achieve a consistent statistical model, a thirteenth attribute identifying a minimum number of consistent speech inputs to be received from a user for the first voice phrase to be added to the voice-enrolled grammar, a fourteenth attribute identifying a set of one or more other voice phrases to which the first voice phrase should be compared to determine whether the first voice phrase clashes with any of the one or more other voice phrases, and a fifteenth attribute specifying a storage location of audio of one or more voice phrases to be added to the voice-enrolled grammar.

17. The method of claim 14, wherein making the change comprises deleting the voice phrase from the voice-enrolled grammar.

18. The method of claim 17, wherein deleting the voice phrase from the voice-enrolled grammar comprises executing a VoiceXML tag comprising a plurality of attributes, said plurality of attributes comprising at least two attributes selected from a group of attributes consisting of a first attribute identifying a first identifier for the second voice phrase, a second attribute identifying a second identifier for an expression to which the second voice phrase relates, a third attribute identifying the voice-enrolled grammar from which the second voice phrase is to be deleted, and a fourth attribute identifying an expression of the voice-enrolled grammar to which the second voice phrase relates.

19. The method of claim 14, wherein making the change comprises updating the voice phrase contained in the voice-enrolled grammar.

20. The method of claim 19, wherein updating the voice phrase in the voice-enrolled grammar comprises executing a VoiceXML tag comprising a plurality of attributes, said plurality of attributes comprising at least three attributes selected from a group of attributes consisting of a first attribute identifying a first identifier for the third voice phrase, a second attribute identifying a second identifier for a first expression to which the third voice phrase relates, a third attribute identifying a third identifier for the new voice phrase, a fourth attribute identifying a third identifier for a second expression to which the new voice phrase relates, a fifth attribute identifying the voice-enrolled grammar containing the third voice phrase to be updated, a sixth attribute identifying an expression of the voice-enrolled grammar to which the new voice phrase relates, a seventh attribute specifying a semantic tag value to be associated with the new voice phrase in the voice-enrolled grammar, an eighth attribute specifying a semantic tag value to be associated with an expression of the voice-enrolled grammar to which the new voice phrase relates, and a ninth attribute specifying a phrase weight for the new voice phrase.

21. An apparatus comprising:
at least one processor programmed with VoiceXML code to:
prompt a user to provide speech input; and
process the speech input, wherein the processing comprises editing at least one voice-enrolled grammar based on the speech input, the at least one voice-enrolled grammar comprising at least one word or phrase added to the voice-enrolled grammar by the user
wherein the VoiceXML code comprises at least one VoiceXML tag for editing of the at least one voice-enrolled grammar and an identifier associated with the at least one VoiceXML tag that identifies at least one voice phrase of the at least one voice-enrolled grammar to be edited, and
wherein the at least one processor is programmed to edit the at least one voice-enrolled grammar in accordance with attributes associated with the at least one VoiceXML tag.

* * * * *